United States Patent [19]

Kartalopoulos

[11] Patent Number: 5,786,912
[45] Date of Patent: Jul. 28, 1998

[54] WAVEGUIDE-BASED, FABRICLESS SWITCH FOR TELECOMMUNICATION SYSTEM AND TELECOMMUNICATION INFRASTRUCTURE EMPLOYING THE SAME

[75] Inventor: Stamatios V. Kartalopoulos, Clinton Township, Hunterdon County, N.J.

[73] Assignee: Lucent Technologies Inc., Murray Hill, N.J.

[21] Appl. No.: 777,404

[22] Filed: Dec. 27, 1996

[51] Int. Cl.$^6$ .................................................... H04J 14/00
[52] U.S. Cl. .......................... 359/117; 359/128; 359/139
[58] Field of Search ........................ 359/117, 128, 359/139, 163–164; 370/352, 360, 380, 423, 427

[56] References Cited

U.S. PATENT DOCUMENTS 4,894,818  1/1990  Fujioka et al. ......................... 359/117
5,241,409  8/1993  Hill et al. ............................. 359/128
5,371,621  12/1994  Stevens ................................ 359/117

*Primary Examiner*—Kinfe-Michael Negash

[57] ABSTRACT

A switch for selectively cross-coupling first and second input lines to first and second output lines. The switch includes: (1) a waveguide having a cavity for containing signals, (2) first and second wireless transmitters that radiate signals received from the first ands second input lines, respectively, within the cavity, (3) first and second wireless receivers that selectively receive the signals from the cavity and provide the signals to the first and second output lines, and (4) a switch controller that controls the at least some of the first and second wireless transmitters and receivers. The first and second input lines are selectively couplable to the first and second output lines. The waveguide, wireless transmitters and wireless receivers cooperate to provide a fabricless cross-connect within the switch.

24 Claims, 6 Drawing Sheets

WAVEGUIDE-BASED, FABRICLESS SWITCH FOR TELECOMMUNICATION SYSTEM AND TELECOMMUNICATION INFRASTRUCTURE EMPLOYING THE SAME

TECHNICAL FIELD OF THE INVENTION

The present invention is directed, in general, to telecommunications systems and, more specifically, to a waveguide-based, "fabricless" cross-connect switch for a telecommunication system and telecommunication infrastructure employing the switch.

BACKGROUND OF THE INVENTION

In modern society, many people have a telephone at work, a second telephone at home, and a wireless (cellular) telephone for use on the road. Many people also have, or at least share, a fax machine at work and, not infrequently, have a personal fax machine at home. In addition to these "user-to-user" telephone devices, personal computers (PCS) increasingly include modems as a standard feature in the basic PC package, thereby allowing the user of a PC, or even the PC itself, to place or receive telephone calls through the modem interface, whether to "surf" the Internet, to send or receive a fax or e-mail to or from PC memory, or to "dial in" to another computer system to conduct some type of transaction. The recent rapid growth in these computer, fax and wireless technologies has resulted in exponential growth in telephone traffic.

The increased telephone traffic has caused a corresponding demand for ever higher switching capacity. The demand is being met, in part, by a wide variety of switching systems, including ATM (asynchronous transfer mode), SDH (synchronous digital hierarchy), and others. Common to nearly all types of switches, however, is a cross-connect, also known as a "fabric." The cross-connect is, in principle, a matrix of electronic switches (in the earlier days known as a "cross-bar" in which a designated input is connected to a designated output by closing a switch or a series of switches. This input-output connectivity is controlled by a processor that uses a connectivity map stored in memory associated with the processor. The processor opens and closes the electronic switches according to the connectivity map so that the designated inputs are connected to the designated outputs.

Typical large-scale cross-connects are built using many VLSI circuits installed on a number of printed wiring boards (PWB). These implementations inherently raise a number of complex technical issues, such as power dissipation, synchronization, inter-board connectivity, maintenance, testing, physical size requirements (i.e., real estate) and, especially, high cost.

Therefore, there is a need in the art for a simplified cross-connect architecture that uses a minimal amount of circuitry to provide connectivity between a specified number of inputs and a specified number of outputs. There is a further need in the art for a simplified cross-connect architecture that costs less than conventional cross-connects that use banks of "cross-bar" switches to provide connectivity. There is a still further need for a simplified cross-connect architecture that dissipates less power than conventional cross-connects that use banks of "cross-bar" switches.

SUMMARY OF THE INVENTION

To address the above-discussed deficiencies of the prior art, the present invention provides a switch for selectively cross-coupling first and second input lines to first and second output lines, a method of operating the switch and a rack and telecommunications infrastructure containing a plurality of the same. The switch includes: (1) a waveguide having a cavity for containing electromagnetic signals therein, (2) first and second wireless transmitters, coupled to the first and second input lines, respectively, and the waveguide, that radiate signals received from the first and second input lines, respectively, within the cavity, (3) first and second wireless receivers, coupled to the first and second output lines, respectively, and the waveguide, that selectively receive the signals from the cavity and provide the signals to the first and second output lines and (4) a switch controller, coupled to at least some of the first and second wireless transmitters and receivers, that controls the at least some of the first and second wireless transmitters and receivers selectively to couple the first and second input lines to the first and second output lines, the waveguide, the wireless transmitters and the wireless receivers cooperating to provide a fabricless cross-connect within the switch.

The present invention therefore introduces, in effect, a "wireless switch," in which the wire-based cross-connects (constituting the prior art fabric) are replaced with a wireless signal-containing cavity. The cavity is adapted to contain signals spanning a wide range of frequencies. Under control of the switch controller, particular transmitters and receivers are set to matching frequencies to couple the input lines and output lines together through the switch. By eliminating the fabric, the geometric dependence of the cross-connects on the number of input and output lines is eliminated. Instead, the total number of transmitters and receivers need not exceed the total number of input and output lines.

"Waveguide," for purposes of the present invention, is broadly defined as any wave container. The waveguide provides electromagnetic isolation for the signals within its cavity, simultaneously protecting the signals from external interference and preventing the signals from causing interference with other systems.

In one embodiment of the present invention, the switch further comprises a wave generator, coupled to the at least some of the first and second wireless transmitters and receivers, that produces at least one carrier wave to be modulated in the transmitters by received input signals and that produces at least one local oscillator reference to be used in demodulation in the receivers. In an embodiment to be illustrated and described, the switch operates with established carrier frequency bands to provide many channels in a single waveguide. Accordingly, in a related embodiment of the present invention, the switch controller controls at least some of the first and second wireless transmitters and receivers by selecting matching carrier frequencies.

In one embodiment of the present invention, the first and second input lines carry signals that conform to different signal protocols. Thus, the present invention is not constrained to switch signals of only a single protocol. In fact, the signals may each conform to the Asynchronous Transfer Mode ("ATM") protocol, the Synchronous Digital Hierarchy ("SDH") protocol or other conventional or later-adopted communication protocols and still be concurrently communicable within the waveguide.

In one embodiment of the present invention, the signals are demultiplexed from an optical carrier. In the embodiment to be illustrated and described, the many signals carried on an optical carrier (typically an optical fiber) may be demultiplexed and separately introduced into the waveguide for interconnecting. Later, the separate signals may be multiplexed and reintroduced to an optical carrier. Of course, the demultiplexing and multiplexing are optional steps, as the signals may remain separate throughout their communication.

The present invention also introduces a rack of switches arranged in separate rack-mountable chassis. The optical carrier may carry multiplexed signals among the chassis in a common backplane of the rack. Alternatively, separate lines may be employed in the backplane to route the signals among the chassis.

In one embodiment of the present invention, the switch controller is embodied in a computer system, the switch controller controlling at least some of the first and second wireless transmitters and receivers.

In one embodiment of the present invention, the signals are synchronized with respect to one another and carry information at identical bit rates. Alternatively, the signals are not required to be synchronized with respect to one another. Nor are the bit rates of the information carried in the signals required to be identical. Such is not possible in conventional fabric-based switches.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
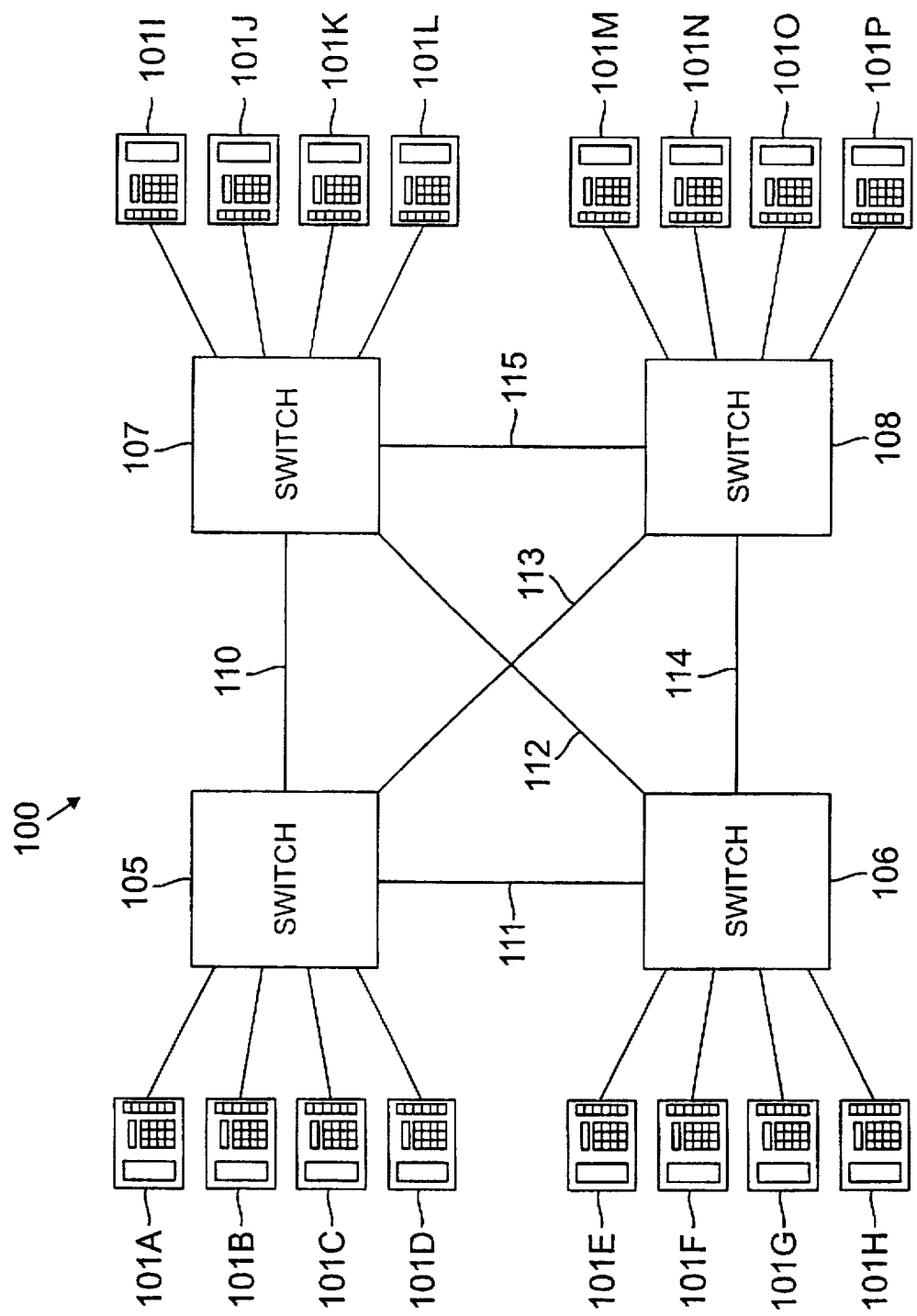
FIG. 1 illustrates an exemplary telephone network including improved waveguide cross-connect switches in accordance with the present invention.

FIG. 1 illustrates exemplary telephone network 100 including improved waveguide cross-connect switches 105–108 in accordance with the present invention. Switches 105–108 may be, for example, switches in the public telephone network (such as central offices) or switches in a privately owned telephone system, such as a PBX (private branch exchange). Each of switches 105–108 is coupled to a plurality of end-user telephone devices 101A–101P. Although telephone devices 101A–101P are designated by a symbol resembling a conventional office telephone, this symbol is merely a convenient representation and should not be construed to limit the types of devices included in the group of telephone devices 101A–101P. In practice, telephone devices 101A–101P include traditional "wired" voice telephones, wireless cellular telephones, facsimile machines, and modem-coupled processing devices, such as computers. In the case of cellular telephones, a wireless link is established with a cellular base station (not shown), which is, in turn, connected to one of switches 105–108.

As will be described in greater detail below, switches 105–108 comprise "fabricless" cross-connects that use tunable RF receivers and tunable RF transmitters to switch signals within waveguide cavities. An incoming voice or data signal is applied to an RF transmitter, which transmits a selected carrier frequency modulated by the voice or data signal into the waveguide cavity. An RF receiver tuned to the selected carrier frequency of the transmitter demodulates the carrier frequency in order to recover the voice or data signal. The incoming voice or data signal may be received from a first selected one of telephone devices 101A–101P, or from another one of switches 105–108 via trunk lines 110–115. The recovered voice or data signal may then be transmitted over one of trunk lines 110–115 to another one of switches 105–108, or may be transmitted to a second selected one of telephone devices 101A–101P. Thus, N incoming signals may be wirelessly switched using one of N transmitters communicating with one of M receivers, where N and M may or may not be equal.

Figure 2:
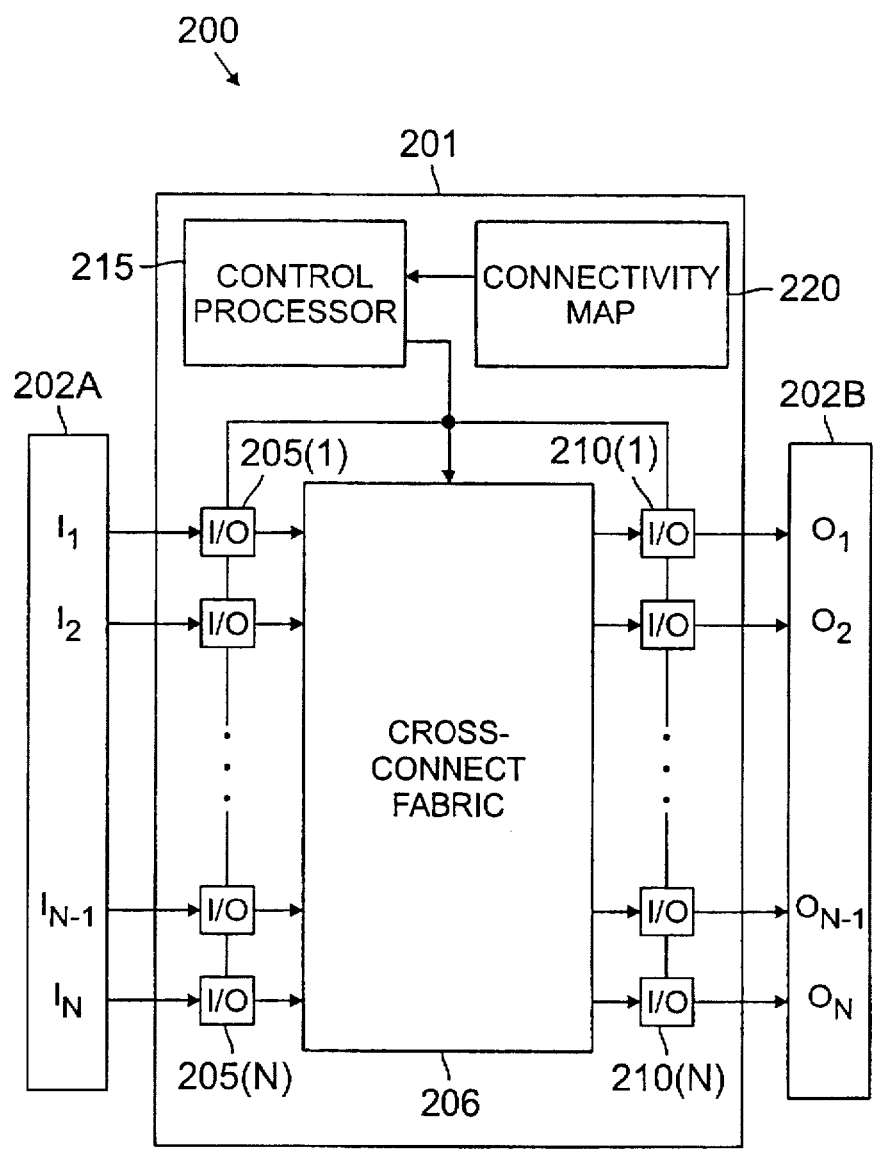
FIG. 2 illustrates a switch infrastructure in accordance with the prior art.

Before further describing "fabricless" cross-connect switches according to the present invention, a discussion of prior art "fabrics" and cross-bar circuits is helpful. FIG. 2 illustrates switch infrastructure 200 in accordance with the prior art. Cross-connect switch 201 receives N input signals, $\{I_1, I_2, I_3, \ldots, I_n\}$, from backplane connector 202A and outputs N output signals, $\{O_1, O_2, O_3, \ldots, O_N\}$, to backplane connector 202B. Backplane connectors 202A and 202P may or may not be part of the same backplane connector. The N received signals are gated by I/O gates 205(1)–205(N), which aid in the synchronization of the N input signals in cross-connect fabric 206. At the outputs of cross-connect fabric 206, I/O gates 210(1)–210(N) gate the received signals to backplane connector 202B to provide synchronization with external circuits. In some embodiments, synchronization on the input and output sides of cross-connect switch 201 is provided by external circuits, thereby eliminating the need for I/O gates 205(1)–205(N) and 210(1)–210(N).

Cross-connect fabric 206 typically comprises banks of cross-bars switches operating under the control of control processor 215 and connectivity map 220. Consider an exemplary 100×100 cross-connect fabric 206 that receives 100 incoming signals, $\{I_1, I_2, I_3, \ldots, I_{100}\}$, and that outputs 100 outgoing signals, $\{O_1, O_2, O_3, \ldots, O_{100}\}$. Each of the 100 incoming signals is applied to an input line on one of five 20×8 cross-bar switches in a "first bank" of cross-bar switches. Each 20×8 cross-bar switch has twenty input lines, each one of which is connected by one of eight switches to each one of the eight output lines. Thus, each 20×8 cross-bar switch contains 160 switches which allow every input line to be coupled to every output line. Since the 20×8 cross-bar switch has only eight output lines, only eight of the twenty input lines can be active at once. Thus, the first bank of five 20×8 cross-bar switches outputs a total of 40 signals to a second bank of cross bar switches.

The second bank of cross-bar switches in the exemplary prior art device comprises five 8×8 cross-bar switches. The second bank of cross-bar switches receives 40 input signals and outputs 40 output signals. Each of the 8×8 cross-bar switches contains 64 switches which allow any one of the eight input lines to be coupled to any one of the eight output lines. Each of the eight output lines of each 20×8 cross-bar switch is wired to one of the eight input lines of a separate one of the 8×8 cross-bar switches. Thus, each 20×8 cross-bar switch has one and only output line coupled to one and only one input line on each of the five second bank 8×8 cross-bar switches. By proper switch selection, control processor 215 can route an input signal received on any one of the 100 input lines of the first bank of cross-bar switches to any one of the 40 output lines of the second bank of cross-bar switches.

Next, the second bank of five 8×8 cross-bar switches outputs its 40 signals to a third bank of cross bar switches. The third bank of cross-bar switches in the exemplary prior art device comprises five 8×20 cross-bar switches. The second bank of cross-bar switches receives 40 input signals and outputs 100 output signals. Each of the 8×20 cross-bar switches contains 160 switches which allow any one of the eight input lines to be coupled to any one of the twenty output lines. Each of the eight output lines of each 8×8 cross-bar switch in the second bank is wired to one of the eight input lines of a separate one of the 8×20 cross-bar switches in the third bank. Thus, each of the five 8×20 cross-bar switches has one and only input line coupled to one and only one output line on each of the five second bank 8×8 cross-bar switches. By proper switch selection, control processor 215 can route an input signal received on any one of the 100 input lines of the first bank of cross-bar switches to any one of the 100 output lines of the third bank of cross-bar switches.

The above-described exemplary cross-connect fabric 206 comprises a 100×100 cross-bar switch. The first bank contains (5×160)=800 switches, the second bank contains (5×64)=320 switches, and the third bank contains (5×160)= 800 switches, for a total of 1920 switches. Since each of the five 20×8 cross-bar switches in the first bank can handle only eight incoming calls at a time, exemplary cross-connect fabric 206 can handle only 40 incoming calls at a time. Other cross-bar architectures may be used that can handle a full 100 calls at a time. However, more switches must be used. For example, an alternative cross-connect fabric 206 comprising a first bank of ten 10×10 cross-bar switches, a second band of ten 10×10 cross-bar switches, and a third bank of ten 10×10 cross-bar switches will provide full connectivity between 100 input lines and 100 output lines simultaneously, but will contain 3000 switches. Furthermore, connectivity map 220 used by control processor 215 becomes larger and more complex as the number of switches in cross-connect fabric 206 increases. As the following description will demonstrate, the present invention provides a simplified "fabricless" cross-connect that utilizes, for example, 100 transmitters and 100 receivers to provides full connectivity between 100 incoming signal lines and 100 outgoing signal lines.

Figure 3:
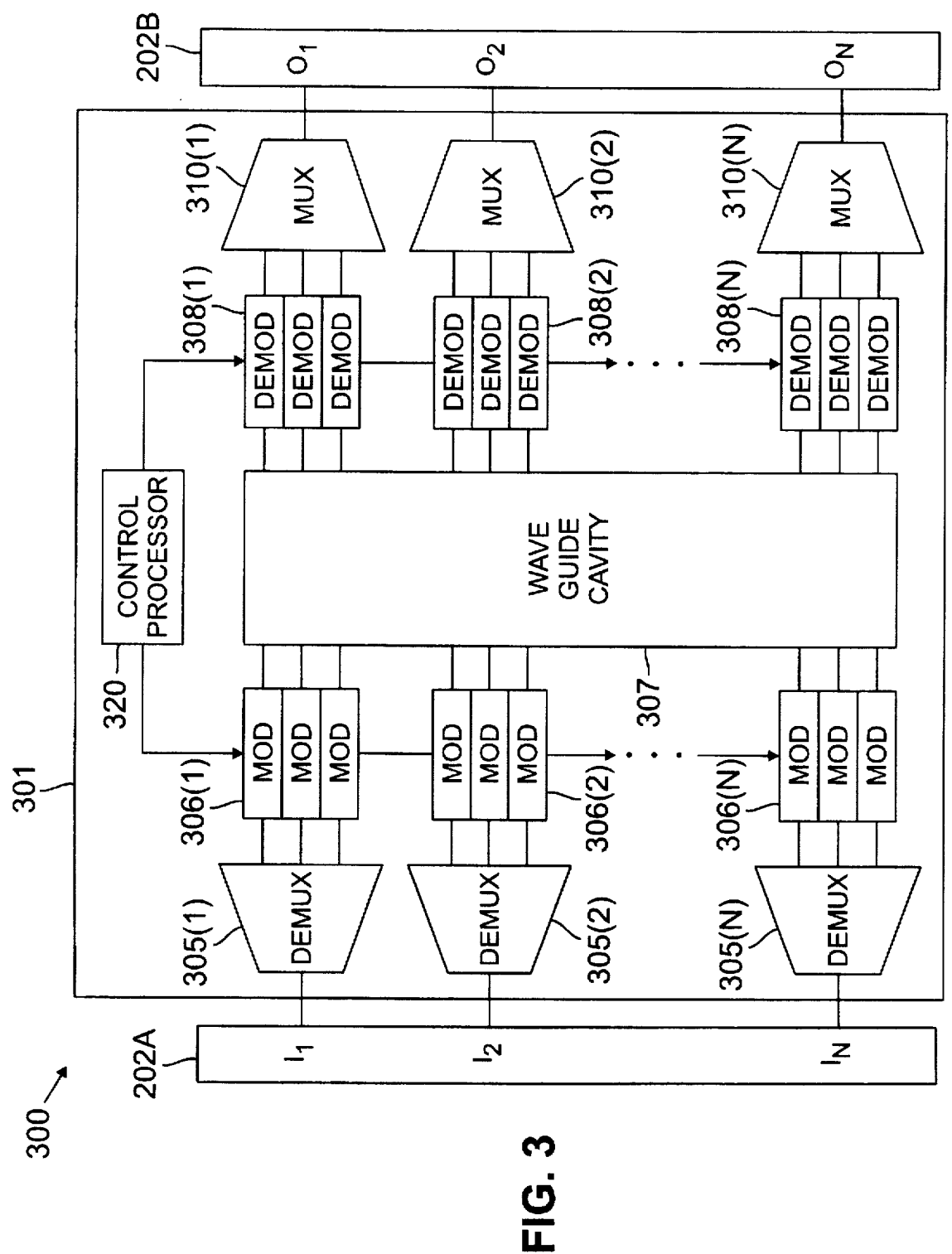
FIG. 3 illustrates a telecommunication system which includes a "fabricless" waveguide cross-connect switch in accordance with a first embodiment of the present invention.

FIG. 3 illustrates telecommunication system 300, which includes "fabricless" waveguide cross-connect switch 301 in accordance with a first embodiment of the present invention.

Waveguide cross-connect switch 301 receives N incoming signals, $\{I_1, I_2, I_3, \ldots, I_N\}$, on N input lines. The incoming signals $\{I_1, I_2, I_3, \ldots, I_N\}$ may be optical signals, electrical signals, or electromagnetic signals. In one embodiment of the present invention, each of the incoming signals is a multiplexed signal comprised of numerous individual voice or data signals. The incoming multiplexed signals from backplane 202A are first demultiplexed by demultiplexers 305(1)–305(N). Each of the individual demultiplexed voice or data signals is then used to modulate a carrier signal in the modulators (transmitters) 306(1)–306(N). The modulated carriers are then transmitted into waveguide cavity 307.

In waveguide cavity 307, receiving antennas (not shown) coupled to demodulators (receivers) 308(1)–308(N) pick up the transmitted carrier signals. Demodulators 308(1)–308 (N) demodulate the transmitted carrier signals to recover the individual demultiplexed voice or data signals. Switching is performed within waveguide cavity 307 by tuning a selected demodulator to the same carrier frequency being used by a selected modulator. Two or more of the recovered voice or data signals may then be multiplexed together in multiplexers 310(1)–310(N) to form output signals $\{O_1, O_2, O_3, \ldots, O_N\}$, which are output to backplane connector 202B.

In an alternate embodiment of the present invention, incoming signals $\{I_1, I_2, I_3, \ldots, I_N\}$ and outgoing signals $\{O_1, O_2, O_3, \ldots, O_N\}$ are not multiplexed, so that neither demultiplexers 305(1)–305(N) nor multiplexers 310(1)–310 (N) are needed. In such an alternate embodiment, incoming signals $\{I_1, I_2, I_3, \ldots, I_N\}$ are individual voice and data signals that are coupled directly to modulators 306(1)–306 (N) and outgoing signals $\{O_1, O_2, O_3, \ldots, O_N\}$ are individual voice and data signals that are generated at the outputs of demodulators 308(1)–308(N) and sent to backplane connector 202B, either directly or indirectly through a buffer gate.

For the purpose of simplicity in further describing the operation of waveguide cross-connect switch 301, it will be assumed that neither the incoming signals $\{I_1, I_2, I_3, \ldots, I_N\}$ nor the outgoing signals $\{O_1, O_2, O_3, \ldots, O_N\}$ are multiplexed, so that modulators 306(1)–306(N) and demodulators 308(1)–308(N) are therefore not present in waveguide cross-connect switch 301. Hence incoming signal lines are coupled (directly or indirectly) to individual, dedicated modulators, and outgoing signal lines are coupled (directly or indirectly) to individual, dedicated demodulators. Those skilled in the art will understand, however, that the operation of a waveguide cross-connect switch using multiplexed signals will not differ in any consequential manner from the simpler embodiment described herein.

Each incoming signal modulates a carrier frequency {F1, F2, . . . ,FN}, where each carrier frequency is about 10 times the frequency of the incoming signal to minimize intermodulation issues. Control processor 320 sets each of the programmable modulators 306(1)–306(N) to different carrier frequencies. Each modulated carrier frequency is guided to, and transmitted into, waveguide cavity 307. In a preferred embodiment, waveguide cavity 307 is lined with an absorptive material that absorbs radio frequency energy, thereby minimizing multipath fading in the channels of the receivers (i.e., demodulators 308(1)–308(N)). In a preferred embodiment, waveguide cavity 307 provides electromagnetic shielding that isolates the carrier frequencies from external interfering signals and prevents the carrier frequencies from leaking out to interfere with external radio devices.

Waveguide cavity 307 therefore closely emulates the transmission properties of free-space. Because external interference and multipath reflections are greatly diminished, and because the modulator and demodulator antennas are separated by very small distances (on the order of inches to perhaps a few feet), modulators and demodulators may operate at exceedingly low power.

On the receiver side of waveguide cavity 307, the pick-up antennas of the demodulators receive the modulated carrier frequencies. Control processor 320 sets the tuning frequency of the reference oscillator used by each of the programmable demodulators 308(1)–308(N) to a selected frequency that corresponds to one of the unique, modulated carrier frequencies transmitted by modulators 306(1)–306(N). Thus, each demodulator 308(1)–308(N) is tuned to select and demodulate only one of the unique carrier frequencies being transmitted. The demodulated signal thus recovered is a selected one of the incoming signals originally received by the modulators 306(1)–306(N).

Other, more complex switch architectures that incorporate the present invention may be implemented. It is noted that the above-described waveguide cavity 307 is used to switch signals between inputs and outputs. In this sense, waveguide cavity 307 is unidirectional. Since in a real system there are telephone devices that transmit and receive signals (i.e., they have inputs and outputs), then two waveguide cavities are necessary, thus doubling the overall switching capacity of the system.

Figure 4:
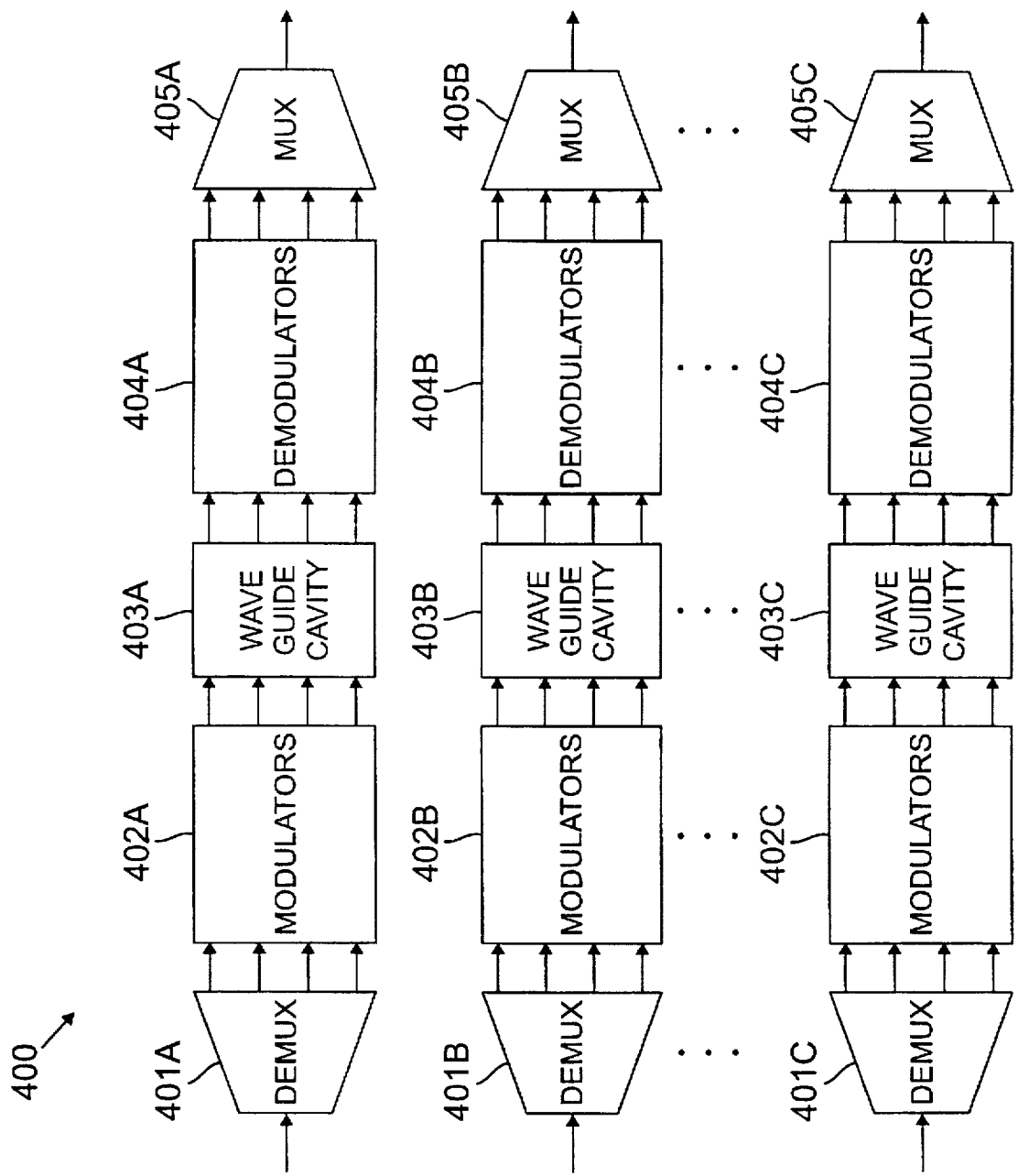
FIG. 4 illustrates a telecommunication system which includes "fabricless" waveguide cross-connect switches in accordance with a second embodiment of the present invention.

FIG. 4 illustrates telecommunication system 400, which includes "fabricless" waveguide cross-connect switches arranged in parallel channels in accordance with a second embodiment of the present invention. For simplicity, the control processors that control switching in telecommunication system 400 are not shown in FIG. 4. Telecommunication system 400 comprises a "front-end" set of demultiplexers 401A–401C that separate incoming multiplexed signals into separate voice and data signals. The individual voice and data signals modulate carrier frequencies generated by modulators 402A–402C. The modulated carrier waves are transmitted into waveguide cavities 403A–403C where they are received by pickup antennas coupled to demodulators 404A–404C. Demodulators 404A–404C recover the voice and data signals and relay them to multiplexers 405A–405C, where they are multiplexed together before being transmitted back into an external telephone system.

Figure 5:
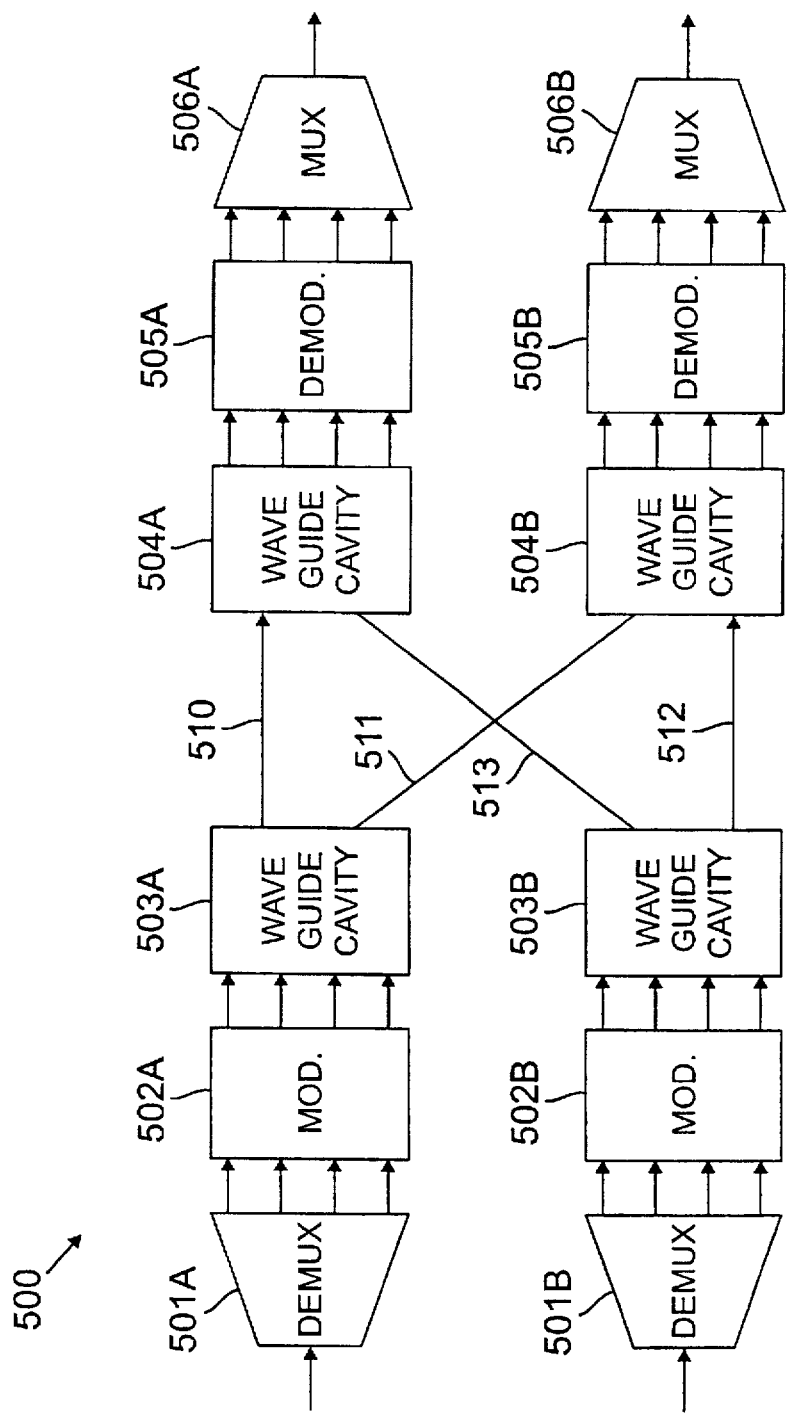
FIG. 5 illustrates a telecommunication system which includes "fabricless" waveguide cross-connect switches in accordance with a third embodiment of the present invention.

FIG. 5 illustrates telecommunication system 500, which includes "fabricless" waveguide cross-connect switches in parallel and tandem with crossing paths in accordance with a third embodiment of the present invention. Telecommunication system 500 comprises a "front-end" set of demultiplexers 501A and 501B that separate incoming multiplexed signals into separate voice and data signals. The individual voice and data signals modulate carrier frequencies generated by modulators 502A and 502B. The modulated carrier waves are transmitted into waveguide cavities 503A and 503B. The modulated carrier waves are then retransmitted into a second set of waveguide cavities, waveguide cavities 504A and 503B. The carrier frequencies in waveguide cavity 503A are relayed onward by data links 510 and 511 to waveguide cavities 504A and 504B, respectively. The carrier frequencies in waveguide cavity 503B are relayed onward by data links 513 and 512 to waveguide cavities 504A and 504B, respectively. Demodulators 505A and 505B recover the voice and data signals and relay them to multiplexers 506A and 506B, where they are multiplexed together before being transmitted back into the external telephone system.

In one embodiment, data links 510–513 comprise amplifiers that boost the strength of the signals that are received from waveguide cavities 503A and 503B before retransmitting them in waveguide cavities 504A and 504B. Additionally, data links 510–513 may comprise a plurality of demodulator/modulator pairs, wherein the demodulators demodulate the carrier frequencies received from waveguides 503A and 503B and the modulators remodulate the recovered voice and data signals, perhaps at different frequencies, prior to retransmission in waveguide cavities 504A and 504B.

Control processors (not shown) enable an incoming signal received in a first data channel to be switched into a second data channel. For example, if units 501A, 502A, 503A, 504A, 505A and 506A form a first data channel, the control processor can cause a selected incoming signal to be transmitted on a carrier frequency in waveguide cavity 503A that is picked up by an antenna coupled to data link 511. Data link 511 then retransmits the selected incoming signal in waveguide cavity 504B, using the same or a different carrier frequency. The incoming signal is therefore switched into the second data channel comprised of units 501B, 502B, 503B, 504B, 505B and 50GB. The control processor ensures that the incoming signal that is switched over to the second data channel is not retransmitted on a carrier frequency that is already in use in the second data channel.

Figure 6:
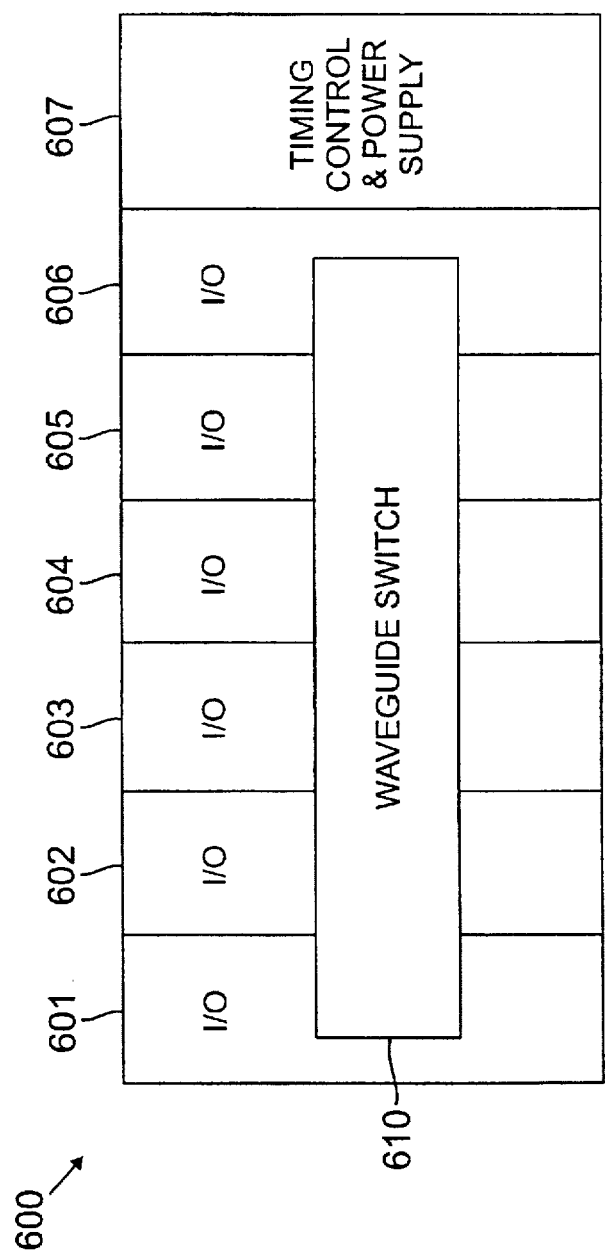
FIG. 6 illustrates a telecommunications subrack which includes a plurality of input/output units mounted on a backplane of the subrack, wherein a "fabricless" waveguide cross-connect switch in accordance with the present invention is coupled to the backplane of the subrack to provide connectivity between the input/output units.

FIG. 6 illustrates telecommunications subrack 600, which includes a plurality of input/output units 601–606 mounted on a backplane of subrack 600, wherein "fabricless" cross-connect waveguide switch 610 in accordance with the present invention is coupled to the backplane of subrack 600 to provide connectivity between input/output (I/O) units 601–606. I/O units 601–606 receive incoming signals from wire connections to an external telephone system. The incoming signals are routed through circuit cards in the I/O units to connectors in the backplane of subrack 600. Timing, control and power supply (TC&P) unit 607 provides power to I/O units 601–606 and waveguide switch 610 and, where necessary, provides timing signals to synchronize the switching of the incoming signals. Waveguide switch 610 provides a signal path that transfers signals from inputs to outputs of I/O units 601–606 and also provides switching between the I/O units 601–606. In one embodiment, the multiplexer/demultiplexer circuitry and the modulator/demodulator circuitry used by waveguide switch 610 may actually be part of the backplane connector of subrack 600, so that the external portion of waveguide switch 610 that provides connectivity consists only of a passive cavity apparatus. In another embodiment, more than one waveguide switch may be attached in parallel to the backplane of subrack 600 in order to increase the overall bandwidth capacity of the waveguide cavities.

The present invention provides numerous advantages over the prior art. In traditional cross-connects, all signals must be at the same bit-rate and all are synchronized. In the "fabricless" waveguide cross-connect switch of the present invention, the signals do not have to be at the same bit rate, nor do they have to be synchronized in order to be switched. Switching different bit rates simultaneously allows simultaneous switching of different signal types, such as ATM and SDH signals. In addition, one transmitted signal may be received by more than one receiver at different I/Os, if the receivers are tuned by the controller. This enables point-to-multipoint or multicast capabilities, a function that is extremely complex with current switching fabrics. The present invention also may use existing mature and simplified cellular and PCS technology to implement the modulator and demodulator circuitry. This allows the waveguide cross-connect to take advantage of improvements in cellular and PCS technology in terms of reduced cost, low power consumption, and decreased physical size.

Although the present invention and its advantages have been described in detail, those skilled in the art should understand that they can make various changes, substitutions and alterations herein without departing from the spirit and scope of the invention in its broadest form.

What is claimed is:

1. A switch for selectively cross-coupling first and second input lines to first and second output lines, comprising:
   a waveguide having a cavity for containing signals therein;
   first and second wireless transmitters, coupled to said first and second input lines, respectively, and said waveguide, that radiate signals received from said first and second input lines, respectively, within said cavity;
   first and second wireless receivers, coupled to said first and second output lines, respectively, and said waveguide, that selectively receive said signals from said cavity and provide said signals to said first and second output lines; and
   a switch controller, coupled to at least some of said first and second wireless transmitters and receivers, that controls said at least some of said first and second wireless transmitters and receivers selectively to couple said first and second input lines to said first and second output lines, said waveguide, said wireless transmitters and said wireless receivers cooperating to provide a fabricless cross-connect within said switch.

2. The switch as recited in claim 1 further comprising a carrier wave generator, coupled to said at least some of said first and second wireless transmitters, that produces at least one carrier wave to be modulated by said signals.

3. The switch as recited in claim 1 wherein said switch controller controls at least some of said first and second wireless transmitters and receivers by selecting matching carrier frequencies.

4. The switch as recited in claim 1 wherein said first and second input lines carry signals that conform to different signal protocols.

5. The switch as recited in claim 1 wherein said signals are demultiplexed from an optical carrier.

6. The switch as recited in claim 1 wherein said signals are synchronized with respect to one another and carry information at identical bit rates.

7. A method of selectively cross-coupling first and second input lines to first and second output lines, comprising the steps of:
   radiating signals received from first and second input lines into first and second wireless transmitters, respectively, within a cavity of a waveguide;
   selectively receiving said signals from said cavity into first and second wireless receivers, said first and second receivers providing said signals to said first and second output lines, respectively; and
   controlling at least some of said first and second wireless transmitters and receivers selectively to couple said first and second input lines to said first and second output lines, said waveguide, said wireless transmitters and said wireless receivers cooperating to provide a fabricless cross-connect.

8. The method as recited in claim 7 further comprising the step of producing at least one carrier wave to be modulated by said signals radiated in said cavity.

9. The method as recited in claim 7 wherein said step of controlling comprises the step of controlling at least some of said first and second wireless transmitters and receivers by selecting matching carrier frequencies.

10. The method as recited in claim 7 wherein said first and second input lines carry signals that conform to different signal protocols.

11. The method as recited in claim 7 further comprising the step of demultiplexing said signals from an optical carrier.

12. The method as recited in claim 7 wherein said signals are synchronized with respect to one another and carry information at identical bit rates.

13. A rack-mountable switch for selectively cross-coupling a plurality of input lines to a plurality of output lines, comprising:
    a chassis having a connector for mating with a backplane of a rack, said connector providing a path for signals to be carried on a plurality of input lines and a plurality of output lines;
    a waveguide having a cavity for containing signals therein;
    plurality of wireless transmitters, coupled between said plurality of input lines and said waveguide and operable at given carrier frequencies, that radiate signals received from said plurality of input lines within said cavity;
    plurality of wireless receivers, coupled between said plurality of output lines and said waveguide and operable at said given carrier frequencies, that selectively receive said signals from said cavity and provide said signals to said plurality of output lines; and
    a switch controller, coupled to at least some of said plurality of wireless transmitters and receivers, that assigns said given carrier frequencies to said at least some of said plurality of wireless transmitters and receivers selectively to couple said plurality of input lines to said plurality of output lines, said waveguide, said wireless transmitters and said wireless receivers cooperating to provide a fabricless cross-connect within said switch.

14. The rack-mountable switch as recited in claim 13 further comprising a carrier wave generator, under control of said switch controller and coupled to said at least some of said plurality of wireless transmitters and receivers, that produces said given carrier frequencies.

15. The rack-mountable switch as recited in claim 13 wherein said switch controller controls at least some of said plurality of wireless transmitters and receivers by selecting matching carrier frequencies.

16. The rack-mountable switch as recited in claim 13 wherein said plurality of input lines carry signals that conform to different signal protocols.

17. The rack-mountable switch as recited in claim 13 wherein said signals are demultiplexed from an optical carrier forming a portion of said backplane.

18. The rack-mountable switch as recited in claim 13 wherein said signals are synchronized with respect to one another and carry information at identical bit rates.

19. A telecommunication infrastructure, comprising:
    a plurality of endpoints; and
    a plurality of switches, coupled to said plurality of endpoints via a plurality of input lines and a plurality of output lines, for selectively cross-coupling said endpoints, each of said plurality of switches including:
    a waveguide having a cavity for containing signals therein,
    a plurality of wireless transmitters, coupled to said plurality of input lines, respectively, and said waveguide, that radiate signals received from said plurality of input lines, respectively, within said cavity, a plurality of wireless receivers, coupled to said plurality of output lines, respectively, and said waveguide, that selectively receive said signals from said cavity and provide said signals to said plurality of output lines, and a switch controller, coupled to at least some of said plurality of wireless transmitters and receivers, that controls said at least some of said plurality of wireless transmitters and receivers selectively to couple said plurality of input lines to said plurality of output lines, said waveguide, said wireless transmitters and said wireless receivers cooperating to provide a fabricless cross-connect within said switch.

20. The infrastructure as recited in claim 19 further comprising a carrier wave generator, coupled to said at least some of said plurality of wireless transmitters, that produces at least one carrier wave to be modulated by said signals.

21. The infrastructure as recited in claim 19 wherein some of said plurality of endpoints are mobile stations and said switch controller controls at least some of said plurality of wireless transmitters and receivers by selecting matching carrier frequencies.

22. The infrastructure as recited in claim 19 wherein said plurality of input lines carry signals that conform to different signal protocols.

23. The infrastructure as recited in claim 19 wherein said signals are demultiplexed from, and multiplexed to, optical carriers.

24. The infrastructure as recited in claim 19 wherein said signals are synchronized with respect to one another and carry information at identical bit rates.

* * * * *